(12) United States Patent
Tetsuda et al.

(10) Patent No.: US 8,235,350 B2
(45) Date of Patent: Aug. 7, 2012

(54) HYDRAULIC UNIT SUPPORT STRUCTURE

(75) Inventors: Toshiyuki Tetsuda, Nissin (JP); Masashi Kodan, Himeji (JP); Katsuyuki Furuhata, Kariya (JP)

(73) Assignees: Toyota Jidosha Kabushiki Kaisha, Aichi-ken (JP); Advics Co., Ltd., Aichi (JP)

( * ) Notice: Subject to any disclaimer, the term of this patent is extended or adjusted under 35 U.S.C. 154(b) by 487 days.

(21) Appl. No.: 12/296,728

(22) PCT Filed: Apr. 25, 2007

(86) PCT No.: PCT/IB2007/001069
§ 371 (c)(1),
(2), (4) Date: Oct. 10, 2008

(87) PCT Pub. No.: WO2007/122504
PCT Pub. Date: Nov. 1, 2007

(65) Prior Publication Data
US 2009/0302189 A1 Dec. 10, 2009

(30) Foreign Application Priority Data
Apr. 25, 2006 (JP) ................................. 2006-120979

(51) Int. Cl.
*F16M 13/00* (2006.01)
(52) U.S. Cl. ...... 248/560; 248/635; 267/293; 303/119.3
(58) Field of Classification Search .................. 248/560, 248/603, 608, 609, 634, 635, 222.41, 224.8, 248/223.21, 221.12, 220.31; 267/136, 293; 303/116.4, 119.3
See application file for complete search history.

(56) References Cited

U.S. PATENT DOCUMENTS

| | | | | |
|---|---|---|---|---|
| 1,778,992 A | * | 10/1930 | Wulfert | 248/635 |
| 2,717,717 A | * | 9/1955 | Busch | 220/483 |
| 3,270,995 A | * | 9/1966 | Shears | 248/221.12 |

(Continued)

FOREIGN PATENT DOCUMENTS

JP 45-15411 6/1970
(Continued)

OTHER PUBLICATIONS

Japanese Office Action issued in corresponding Japanese Application No. 2006-120979 dated Feb. 21, 2012 (with translation) (4 pages).

*Primary Examiner* — Anita M King
(74) *Attorney, Agent, or Firm* — Sughrue Mion, PLLC (57) ABSTRACT

A hydraulic unit support structure includes a bracket (40) having a slot (50) and seat surfaces formed around the slot, and a shock-absorbing member (70) attached to the hydraulic unit (10). The shock-absorbing member (70) is fitted into the slot (50) of the bracket so that the hydraulic unit is supported on the bracket by the shock-absorbing member. The shock-absorbing member has a small-diameter portion (74) inserted into the slot of the bracket and large-diameter portions (76, 78) making contact with the seat surfaces of the bracket around the slot. The slot of the bracket has an insertion-fit region (52) formed at one end of the slot in the long-axis direction and a reduced width region formed at a position spaced apart from the one end in the long-axis direction by a distance substantially equal to the diameter of the small-diameter portion.

11 Claims, 9 Drawing Sheets

U.S. PATENT DOCUMENTS

| | | | |
|---|---|---|---|
| 3,317,167 A * | 5/1967 | Becker et al. | 248/73 |
| 3,895,408 A * | 7/1975 | Leingang | 16/2.1 |
| 4,176,428 A | 12/1979 | Kimura | |
| 4,521,004 A * | 6/1985 | Caldwell | 267/141.4 |
| 5,044,588 A * | 9/1991 | Gunter | 248/214 |
| 5,335,893 A * | 8/1994 | Opp | 248/635 |
| 5,653,349 A * | 8/1997 | Dana et al. | 211/189 |
| 6,098,949 A * | 8/2000 | Robinson | 248/635 |
| 6,932,439 B2 * | 8/2005 | Nakazawa | 303/116.4 |
| 7,004,552 B2 * | 2/2006 | Takumori et al. | 303/116.4 |
| 7,510,163 B2 * | 3/2009 | Schlitzkus et al. | 248/635 |
| 2002/0190572 A1 | 12/2002 | Nakazawa | |
| 2008/0023899 A1 * | 1/2008 | Hasegawa et al. | 267/141.1 |

FOREIGN PATENT DOCUMENTS

| | | |
|---|---|---|
| JP | 54-150784 | 4/1978 |
| JP | 54-036706 U | 3/1979 |
| JP | 2002-317852 A | 10/2002 |
| JP | 2004-521276 A | 7/2004 |
| TW | 200708438 A | 3/2007 |
| WO | 02/10610 A1 | 2/2002 |

* cited by examiner

MOTOR ROTATION AXIS

HYDRAULIC UNIT SUPPORT STRUCTURE

BACKGROUND OF THE INVENTION

1. Field of the Invention

The present invention relates to a hydraulic unit support structure that supports a hydraulic unit on a bracket through a shock-absorbing member attached to the hydraulic unit by fitting the shock-absorbing member into a slot formed in the bracket.

2. Description of Related Art

Regarding the hydraulic unit support structure, there is conventionally known an arrangement in which a shock-absorbing member is fitted into a slot-like opening of an oval or elliptical shape formed in a bracket (see, e.g., Japanese International Application Publication No. 2004-521276).

In the meantime, with this kind of hydraulic unit support structure, a relatively large clearance is left between the shock-absorbing member and the slot, to facilitate fitting the shock-absorbing member into the slot during assembly. However, this arrangement may raise a problem in that, although the ease of assembly is increased, the shock absorbing function may be impaired due to the reduction in an area in which the shock-absorbing member makes contact with seat surfaces of the bracket around the slot.

SUMMARY OF THE INVENTION

The invention provides a hydraulic unit support structure that enables a shock-absorbing member to exhibit a good shock absorbing function, while maintaining excellent ease of assembly.

In a first aspect of the invention, a hydraulic unit support structure includes: a bracket having a slot and seat surfaces formed around the slot; and a shock-absorbing member that is attached to a hydraulic unit and is fitted into the slot of the bracket so that the hydraulic unit is supported on the bracket through the shock-absorbing member. The shock-absorbing member has a small-diameter portion that is inserted into the slot of the bracket and large-diameter portions that contact with the seat surfaces of the bracket around the slot. The slot of the bracket has a length in the long-axis direction greater than the diameter of the small-diameter portion, and has an insertion-fit region formed on the first end side of the slot in the long-axis direction. The insertion-fit region has a radius of curvature generally corresponding to the radius of the small-diameter portion of the shock-absorbing member. The slot of the bracket further has a reduced width region formed at a first position spaced apart toward a second end of the slot, which is opposite the first end, from the first end in the long-axis direction by a distance substantially corresponding to the diameter of the small-diameter portion. The reduced width region has a width smaller than the diameter of the small-diameter portion in a short-axis direction orthogonal to the long-axis direction.

The slot of the bracket has a length in the long-axis direction that is greater than the sum of a radius of the large-diameter portion and the radius of the small-diameter portion. In this case, the reduced width region may extend toward the second end in the long-axis direction of the slot of the bracket from the first position at least by a distance equal to the difference in radius of the large-diameter portions and the small-diameter portion. According to the aspect of the present invention, the contact area between the large-diameter portions of the shock-absorbing member and the bracket can be increased on the other side of the large-diameter portions of the shock-absorbing member, and the movement of the small-diameter portion of the shock-absorbing member toward the other end side can be properly restrained by means of the reduced width region.

The slot of the bracket may have a teardrop shape, a gourd shape or a keyhole shape.

The long-axis direction of the slot may make an angle of no greater than 90 degrees with respect to the rotational axis of the motor in the hydraulic unit, when viewed from a top in a center axis direction of the shock-absorbing member.

The insertion-fit region of the slot may be provided on the side furthest from a mounting position of the motor of the hydraulic unit, when viewed from a top in a center axis direction of the shock-absorbing member. Accordingly, it is possible to apply a damping action suitable for a vibration mode of the hydraulic unit to the shock-absorbing member.

Another aspect of the invention is directed to a hydraulic unit support structure, which includes a bracket having a slot and seat surfaces formed around the slot; and a shock-absorbing member attached to a hydraulic unit. The shock-absorbing member is fitted into the slot of the bracket so that the hydraulic unit is supported on the bracket by the shock-absorbing member. The shock-absorbing member has a small-diameter portion that is inserted into the slot of the bracket and large-diameter portions that contacts with the seat surfaces of the bracket around the slot. The slot of the bracket has a length in a long-axis direction that is greater than the diameter of the small-diameter portion. The shape of slot is defined by an arc having a first radius of curvature that generally corresponds to the radius of the small diameter portion, an arc having a second radius of curvature that is smaller than the first radius of curvature, and two tangential lines that join the arcs together at corresponding lateral sides.

A further aspect of the invention provides a hydraulic unit support structure that includes a bracket having a slot and seat surfaces formed around the slot; and a shock-absorbing member attached to a hydraulic unit. The shock-absorbing member is fitted into the slot of the bracket so that the hydraulic unit is supported on the bracket by the shock-absorbing member, and has a small-diameter portion that is inserted into the slot of the bracket and large-diameter portions that contact the seat surfaces of the bracket around the slot. The slot of the bracket has a length in a long-axis direction greater than a diameter of the small-diameter portion. The shape of the slot is defined by a first arc having a first radius of curvature generally corresponding to the radius of the small-diameter portion, and a second arc having a second radius of curvature smaller than the first curvature, and two inwardly curved lines joining the first and second arcs together at corresponding lateral sides.

Another aspect of the present invention provides a hydraulic unit support structure that includes a bracket having a slot and seat surfaces formed around the slot; and a shock-absorbing member attached to a hydraulic unit. The shock-absorbing member is fitted into the slot of the bracket so that the hydraulic unit is supported on the bracket by the shock-absorbing member, and further has a small-diameter portion that is inserted into the slot of the bracket and large-diameter portions that contact the seat surfaces of the bracket around the slot. The slot of the bracket has a length in a long-axis direction of the slot greater than a length summing up a diameter of the small-diameter portion and a diameter of the large-diameter portion. The shape of the slot is defined by a first arc having a first radius of curvature generally corresponding to the radius of the small diameter portion, a second arc having a second radius of curvature greater than the first curvature, and two lines generally parallel to a rotational axis of a motor of the hydraulic unit, joining the first and second arcs together. The width between the two lines is smaller than the diameter of the small-diameter portion of the shock-absorption member in a short-axis direction orthogonal to the long-axis direction.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Various embodiments of the present invention will now be described in detail with reference to the accompanying drawings.

Figure 1:
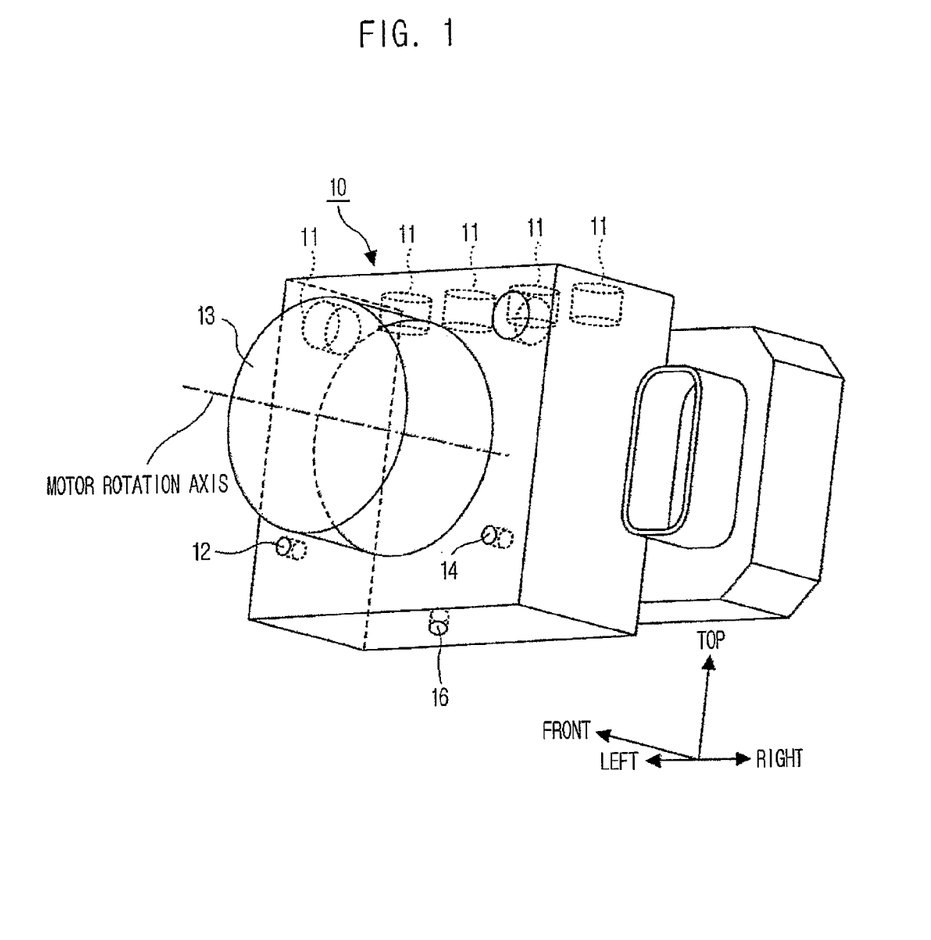
FIG. 1 is a perspective view showing a hydraulic unit 10 supported by a hydraulic unit support structure according to an embodiment of the present invention.

FIG. 1 is a perspective view showing a hydraulic unit 10 supported by a hydraulic unit support structure according to an embodiment of the present invention. The hydraulic unit 10 shown in FIG. 1 forms a part of a brake actuator. A motor or pump for generating a high brake pressure and various electromagnetic valves are received within the hydraulic unit 10. Furthermore, a skid control computer that governs the braking control for an ABS (Anti-lock Brake System), a brake assist, or the like may be incorporated in the hydraulic unit 10. Typically, the hydraulic unit 10 is mounted within an engine compartment. In the following description, directions (top, bottom, left, right, front and rear directions) will be defined as represented in FIG. 1 under the condition that the hydraulic unit 10 is mounted in a typical mounting condition.

A plurality of connecting ports 11 leading to individual wheel cylinders and a master cylinder, both of which are not shown in the drawings, are provided on the top surface of the hydraulic unit 10. Connected to each of the connecting ports 11 is one end of a brake tube (not shown) the other end of which is coupled to a corresponding individual wheel cylinder and the master cylinder.

Two boltholes 12 and 14 are formed on the left and right sides of the motor mounting position 13 on a front surface of the hydraulic unit 10 (on a surface on which the motor is arranged). The boltholes 12 and 14 have axes extending in parallel with a rotational axis of a motor (a motor rotation axis). In addition, a bolthole 16 is formed on a bottom surface of the hydraulic unit 10. The bolthole 16 assumes a position halfway between the boltholes 12 and 14 in a left-right direction, i.e., a position in which an axis of the bolthole 16 intersects the motor rotation axis. The hydraulic unit 10 is supported on a bracket 40 described hereinafter at these three boltholes 12, 14 and 16.

Figure 2:
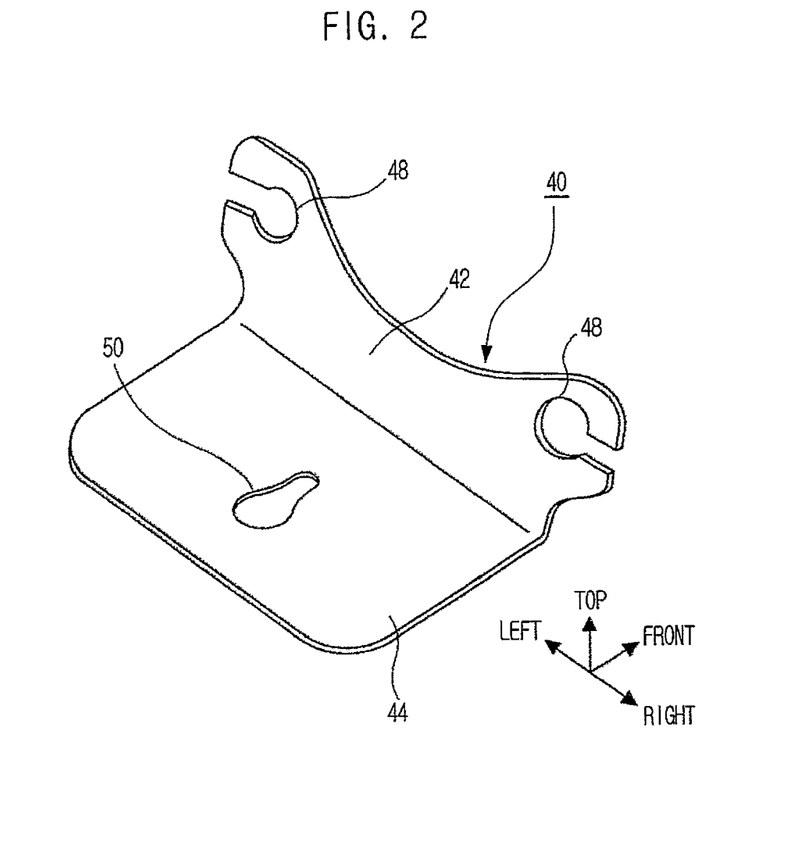
FIG. 2 is a perspective view illustrating one embodiment of a bracket 40.

FIG. 2 is a perspective view illustrating one embodiment of a bracket 40. The bracket 40 may be made of sheet metal and, as illustrated in FIG. 2, have an "L"-like shape, with a front portion 42 that faces the front surface of the hydraulic unit 10 and a bottom portion 44 that faces the bottom surface of the hydraulic unit 10. The bracket 40 is firmly fastened to the vehicle body by means of a fixing structure not shown in the drawings.

On the front portion 42 of the bracket 40, two holes 48 for attaching shock-absorbing members 70 (referred to as "cutout holes 48") are formed at two points in the left and right directions in a corresponding relationship with the boltholes 12 and 14 on the front surface of the hydraulic unit 10. As can be seen in FIG. 2, the cutout holes 48 may be of the type opened at their lateral ends.

On the bottom portion 44 of the bracket 40, a hole 50 for attaching of a shock-absorbing member 70 (referred to as "slot 50") is formed in a corresponding relationship with the bolthole 16 on the bottom surface of the hydraulic unit 10. As can be seen in FIG. 2, the slot 50 has a long axis that has a length greater than the diameter of a small-diameter portion 74 of the shock-absorbing member 70 (see FIG. 3). The shape of the slot 50 will be described later in detail.

Figure 3:
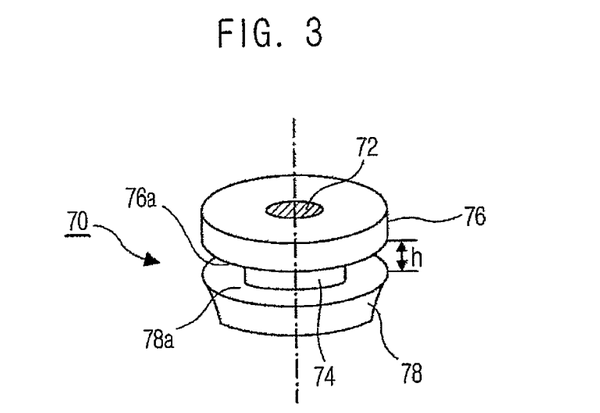
FIG. 3 is a perspective view showing a shock-absorbing member (cushion) 70.

FIG. 3 is a perspective view showing the shock-absorbing member (cushion) 70. The shock-absorbing member 70 is made of an elastic material, such as rubber or a foam material, and has a generally cylindrical shape as a whole. A through-hole 72, into which a collar 90 and a bolt 92 are inserted, is formed in the center portion of the shock-absorbing member 70. The shock-absorbing member 70 has a small-diameter portion 74 at its axial intermediate section and upper and lower large-diameter portions 76 and 78 at its axial end sections. The upper and lower large-diameter portions 76 and 78 have a predetermined radius "r1" (mm) with respect to a center axis of the shock-absorbing member 70. The small-diameter portion 74 lies between the large-diameter portions 76 and 78 and has a predetermined radius "r2" (mm) smaller than "r1" with respect to the center axis of the shock-absorbing member 70. The small-diameter portion 74 has an axial length "h" (mm) substantially corresponding to the thickness of the bracket 40. A surface 76a of the large-diameter portion 76 on the side of the small-diameter portion and a surface 78a of the large-diameter portion 78 on the side of the small-diameter portion are formed in a mutually parallel relationship to extend in a direction perpendicular to an axis of the shock-absorbing member 70. The surfaces 76a and 78a are contact surfaces that contact the opposite surfaces of the bracket 40. Thus, the predetermined radius "r1" of the large-diameter portions 76 and 78 is properly set at such a value as to ensure that a required contact area is secured between the bracket 40 and each of the large-diameter portions 76 and 78.

Three shock-absorbing members 70 are provided, including first, second and third shock-absorbing members, each of which is fitted into cutout holes 48 and the slot 50 of the bracket 40 illustrated in FIG. 2. Specifically, the first and second shock-absorbing members 70 are attached to the front portion 42 of the bracket 40 by inserting the small-diameter portions 74 thereof into the cutout holes 48 through the openings (cutout openings) formed on the lateral sides of the cutout holes 48. Thus, the surfaces 76a and 78a of the two large-diameter portions 76 and 78 of the first and second shock-absorbing members 70 come into contact with the opposite surfaces of the front portion 42 of the bracket 40 around the cutout holes 48. The third shock-absorbing member 70 is attached to the bottom portion 44 of the bracket 40 by pushing the lower large-diameter portion 78 into the slot 50 at one side so as to be exposed to the other side. In other words, the large-diameter portion 78 of the third shock-absorbing member 70 is elastically crushed and inserted into the slot 50, after which the large-diameter portion 78 is restored to its original shape by elasticity. Thus, the surfaces 76a and 78a of the two large-diameter portions 76 and 78 of the third shock-absorbing member 70 come into contact with the opposite surfaces of the bottom portion 44 of the bracket 40 around the slot 50. In order to ease the assembly of the third shock-absorbing member 70, the large-diameter portion 78 thereof may have a diameter gradually reducing from the surface 78a to a bottom end in an axial direction, as shown in FIG. 3. That is, the large-diameter portion 78 of the third shock-absorbing member 70 may be formed into a frustoconical shape that has a radius "r1" on the side contacting the bracket 40 (i.e., at the side of the surface 78a) and a radius smaller than the radius "r1" on a bottom surface (i.e., at the side of a seat surface of a bolt 92 described hereinafter).

Figure 4A:
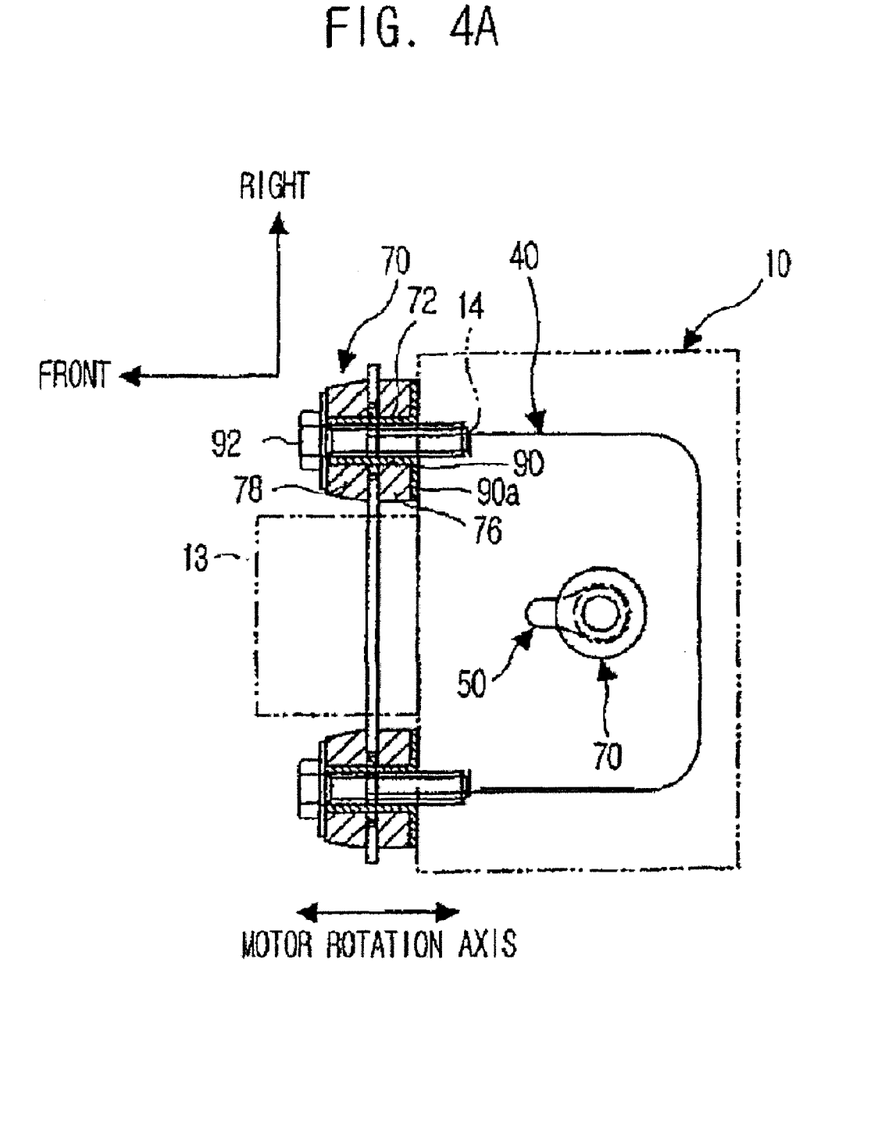
FIGS. 4A and 4B are bottom and side elevational views illustrating a hydraulic unit 10 supported on a bracket 40 through a shock-absorbing member 70.
Figure 4B:
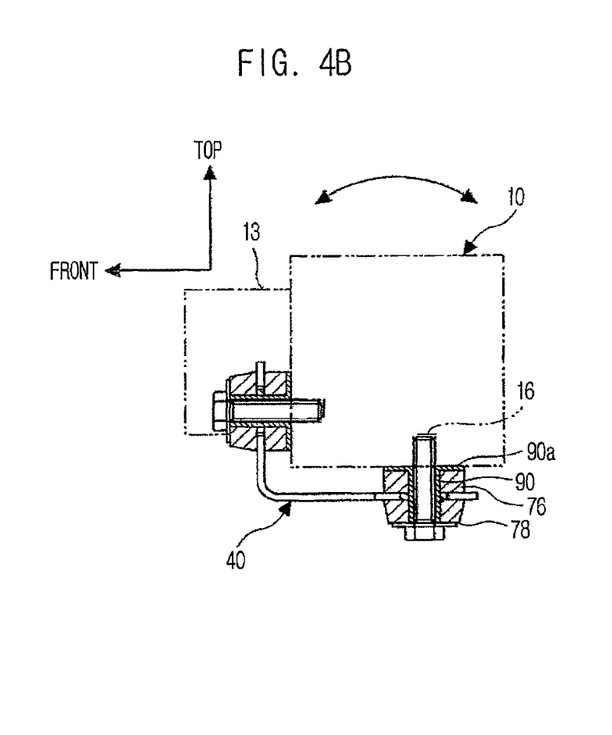

FIG. 4A is a bottom view illustrating the support structure that supports the hydraulic unit 10 through the use of the shock-absorbing members 70, and FIG. 4B is a side elevational view thereof. A schematic contour of the hydraulic unit 10 is depicted by a double-dotted chain line in FIGS. 4A and 4B. For the sake of clarifying the relationship between the shock-absorbing member 70 and the slot 50, a collar 90 and a bolt 92, which will be described hereinafter, are omitted from illustration in FIG. 4A.

As can be seen in FIGS. 4A and 4B, collars 90 are inserted into the through-holes 72 of the respective shock-absorbing members 70 fitted to the cutout holes 48 and the slot 50 of the bracket 40 as set forth above. Each collar 90 is made of, e.g., a metallic material, and is a cylindrical member having an outer diameter that corresponds to the inner diameter of the through-hole 72 of each of the shock-absorbing members 70. As illustrated in FIGS. 4A and 4B, each collar 90 may have a seat portion 90a that contacts the upper large-diameter portion 76 of the shock-absorbing member 70. Bolts 92 are inserted through the collars 90 and threadedly engaged with the boltholes 12, 14 and 16 of the hydraulic unit 10.

As noted above, in the present embodiment, the hydraulic unit 10 is supported on the bracket 40 through the shock-absorbing members 70 by fitting the shock-absorbing members 70 into the respective cutout holes 48 and the slot 50 of the bracket 40 and then combining the hydraulic unit 10 and the bracket 40 with the bolts 92 inserted through the shock-absorbing members 70. Thus, the shock-absorbing members 70 reduce various kinds of vibration applied to the hydraulic unit 10 (e.g., the vibration transferred from a vehicle underbody), while decreasing the vibration generated by the hydraulic unit 10 per se and transferred to a vehicle body through the bracket 40 (e.g., the vibration generated at the time of driving a motor).

In the meantime, as set forth above, brake tubes through which high-pressure brake oil circulates are connected to the top portion of the hydraulic unit 10. For this reason, during operation of the hydraulic unit 10, a great deal of load is exerted on the respective connecting ports 11 of the top portion of the hydraulic unit 10 in a motor axis direction. Due to the fact that the hydraulic unit 10 is supported at a side lower than the connecting ports 11, the load exerted on the top portion of the hydraulic unit 10 tends to induce rocking movement of the hydraulic unit 10 in the motor axis direction, namely, toppling-direction movement of the top portion of the hydraulic unit 10 in the direction as indicated by an arcuate arrow in FIG. 4B. The toppling-direction movement of the hydraulic unit 10 in the front direction is suppressed largely by reception of the load in the two shock-absorbing members 70 arranged on the front portion 42 of the bracket 40, whereas the toppling-direction movement of the hydraulic unit 10 in a rear direction is restrained predominantly by reception of the load at the rear end side of the shock-absorbing member 70 arranged on the bottom portion 44 of the bracket 40.

Figure 5A:
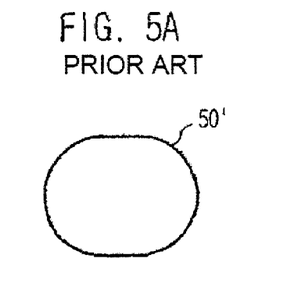
FIGS. 5A, 5B and 5C are views for explaining a relationship between a slot 50' of a comparative example and a shock-absorbing member 70.
Figure 5B:
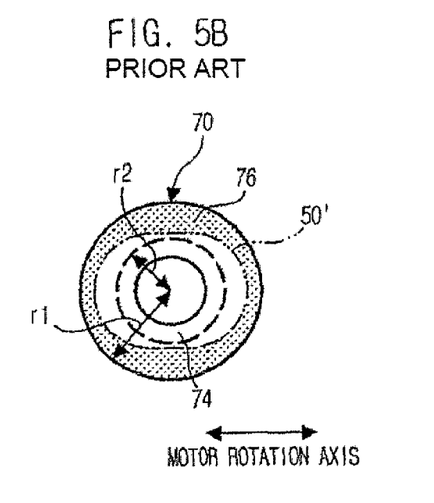
Figure 5C:
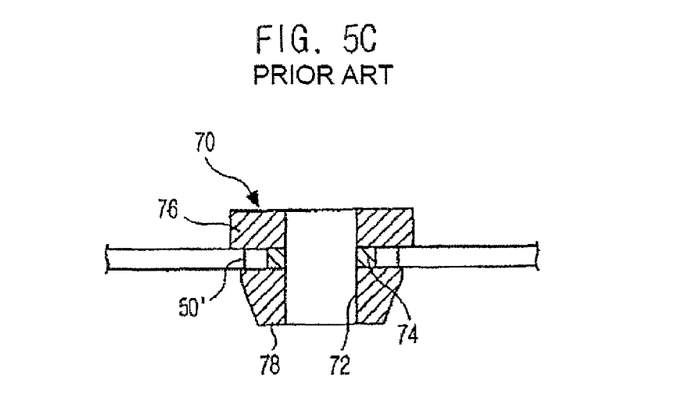

FIG. 5A shows a conventional oval or elliptical slot 50' according to a comparative example, FIG. 5B is a top view illustrating a relationship between the slot 50' of the comparative example and the shock-absorbing member 70, and FIG. 5C is a sectional view showing that relationship.

In the comparative example shown in FIGS. 5A, 5B and 5C, clearances of a relatively large size are formed between the small-diameter portion 74 of the shock-absorbing member 70 and the end portions of the slot 50'. This proportionately reduces the contact area between the large-diameter portions 76 and 78 of the shock-absorbing member 70 and the bracket 40 (the seat surface area illustrated by hatching in FIG. 5B). For this reason, the vibration suppressing action exercised by the shock-absorbing member 70 at the contact surface of the large-diameter portions 76 and 78 becomes too weak to properly control the toppling-direction movement of the hydraulic unit 10. Moreover, because the slot 50' lacks the ability to position in place the shock-absorbing member 70 through radial contact with the latter, it is impossible to properly restrain the position of the shock-absorbing member 70 when fitting the shock-absorbing member 70. Namely, it is difficult to properly position the shock-absorbing member 70 in place.

Figure 6A:
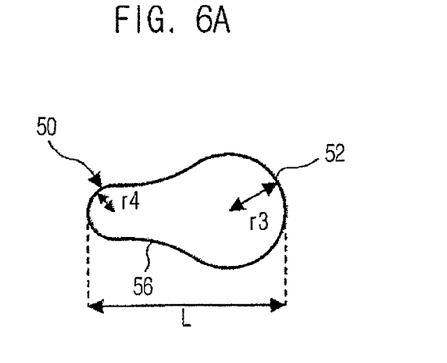
FIGS. 6A, 6B and 6C are views for explaining a relationship between a slot 50 of the present embodiment and a shock-absorbing member 70.
Figure 6B:
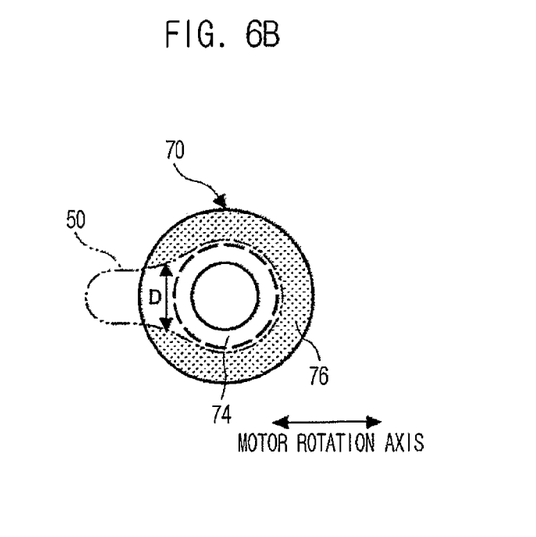
Figure 6C:
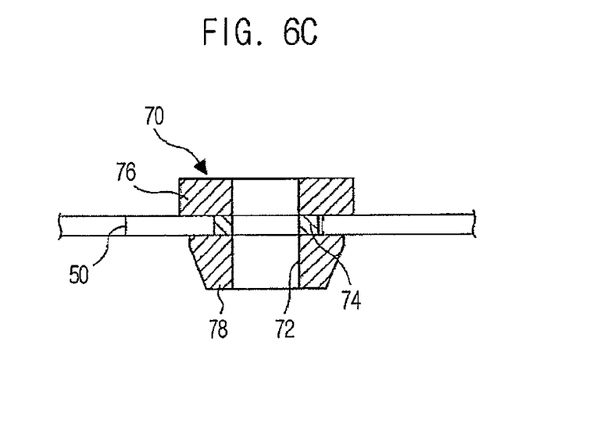

FIG. 6A shows the shape of the slot 50 according to the present embodiment, FIG. 6B is a top view illustrating a relationship between the slot 50 of the present embodiment and the shock-absorbing member 70, and FIG. 6C is a sectional view showing that relationship. The motor axis direction is designated by an arrow in FIG. 6B in which view the left side is the front of a vehicle.

In the present embodiment, the slot 50 has a long axis extending in the motor axis direction and is formed into a gourd shape with a front extension of a reduced width. In other words, the shape of the slot 50 is defined by an arc having a radius of curvature "r3" arranged at a rear side in the motor axis direction, an arc having a radius of curvature "r4" arranged at a front side in the motor axis direction, and two inwardly curved lines 56 (lines bulging toward the center of the slot 50) joining the arcs together at corresponding lateral sides.

The radius of curvature "r3" corresponds to the radius "r2" of the small-diameter portion 74 of the shock-absorbing member 70 and, as illustrated in FIG. 6B, may be a little greater than the radius "r2". The radius of curvature "r4" is set smaller than the radius of curvature "r3". The length "L" between the opposite ends of the slot 50, i.e., the length "L" (mm) in the long-axis direction of the slot 50, is set greater than the length (r1+r2) summing up the radius "r2" of the small-diameter portion 74 of the shock-absorbing member 70 and the radius "r1" of the large-diameter portion 76 of the shock-absorbing member 70. That is, the length "L" in the long-axis direction of the slot 50 is represented by L=r1+r2+β, where the β stands for a parameter properly selected to secure the ease of insertion (ease of assembly) of the large-diameter portion 78 of the shock-absorbing member 70.

The shock-absorbing member 70 is fitted into the region 52 of the slot 50 delineated by the arc having a radius of curvature "r3" (which region will be hereinafter referred to as an "insertion-fit region 52"). When the shock-absorbing member 70 is fitted into the insertion-fit region 52, the insertion-fit region 52 circumscribes an outer circumferential surface of the small-diameter portion 74 of the shock-absorbing member 70 over a circumference range of little greater than 180 degrees, as can be seen in FIG. 6B. Within this circumference range, the radial clearance between the periphery of the insertion-fit region 52 and the outer circumferential surface of the small-diameter portion 74 of the shock-absorbing member 70 is equal to the difference between the diameters of the insertion-fit region 52 and the small-diameter portion 74. As noted above, in the present embodiment, the radius of curvature "r3" of the arc delineating the insertion-fit region 52 generally corresponds to the radius "r2" of the small-diameter portion 74 of the shock-absorbing member 70. This makes it possible to minimize the radial clearance between the periphery of the insertion-fit region 52 and the outer circumferential surface of the small-diameter portion 74 of the shock-absorbing member 70. Thus, it is possible to maximize the contact area between the large-diameter portions 76 and 78 of the shock-absorbing member 70 and the bracket 40 (the seat surface area illustrated by hatching in FIG. 6B) at the rear side of the large-diameter portions 76 and 78 of the shock-absorbing member 70. Furthermore, in the present embodiment, the slot 50 has a short-axis direction width "D" that gradually decreases from a frontal end of the insertion-fit region 52 toward the longitudinal front end of the slot 50. In other words, the short-axis direction width "D" of the slot 50 remains greatest (about twice as great as "r2") at a long-axis direction center position of the insertion-fit region 52 and gradually decreases from the long-axis direction center position toward the longitudinal front end of the slot 50. Thus, it is possible to increase the contact area between the large-diameter portions 76 and 78 of the shock-absorbing member 70 and the bracket 40 even on the front side of the large-diameter portions 76 and 78 of the shock-absorbing member 70. This makes it possible to effectively restrain the movement of the shock-absorbing member 70 with respect to the bracket 40.

As described above, the present embodiment makes it possible to meaningfully increase the contact area between the large-diameter portions 76 and 78 of the shock-absorbing member 70 and the bracket 40, relative to the comparative example illustrated in FIG. 5. Considering the above, the movement of the shock-absorbing member 70 with respect to the bracket 40 is effectively suppressed and, therefore, the toppling-direction movement of the hydraulic unit 10 can be restrained in a proper manner. Accordingly, as compared to the comparative example illustrated in FIG. 5, the required contact area can be increased in an efficient manner, which helps to miniaturize the shock-absorbing member 70 (e.g., to reduce the diameter "r1" of the large-diameter portions 76 and 78 of the shock-absorbing member 70).

Moreover, in accordance with the present embodiment, the short-axis direction width "D" of the slot 50 becomes smaller than the diameter (2×r2) of the small-diameter portion 74 at the front side of the small-diameter portion 74 of the shock-absorbing member 70. Thus, in addition to the increased contact area at the front side of the large-diameter portions 76 and 78 of the shock-absorbing member 70, it also becomes possible to suppress any forward movement of the small-diameter portion 74 of the shock-absorbing member 70 with respect to the bracket 40. This makes it easy to position in place the shock-absorbing member 70 in an assembly process thereof.

Figure 7A:
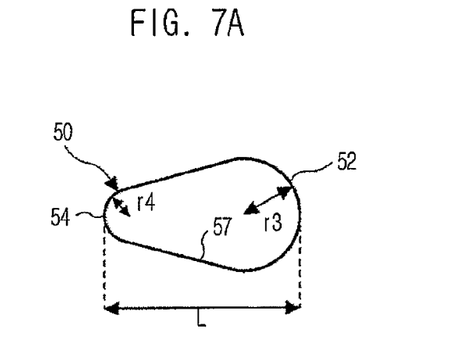
FIGS. 7A, 7B and 7C are views illustrating another embodiment (a first modified embodiment) of the present invention.
Figure 7B:
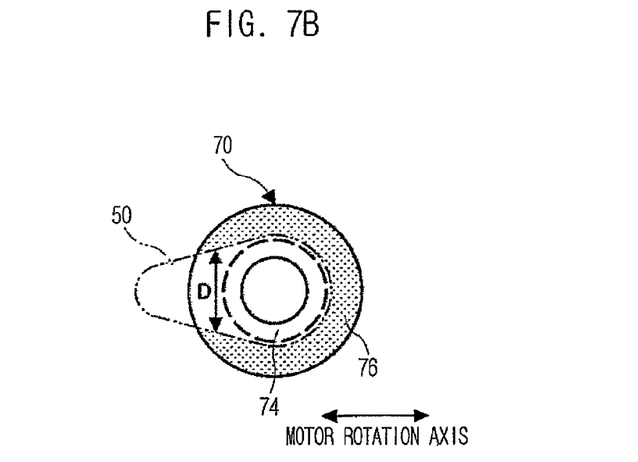
Figure 7C:
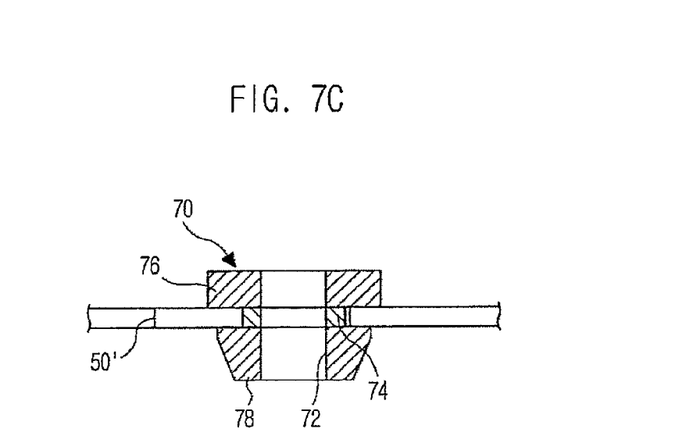

FIG. 7A shows a shape of a slot 50 according to another embodiment of the present invention, FIG. 7B is a top view illustrating a relationship between the slot 50 of the present embodiment and the shock-absorbing member 70, and FIG. 7C is a sectional view showing that relationship. A motor axis direction is designated by an arrow in FIG. 7B in which view the left side is the front of a vehicle. The present embodiment may have the same configuration as that of the foregoing embodiment except for the shape of the slot 50.

In the present embodiment, the slot 50 has a long axis extending in the motor axis direction and is formed into a teardrop shape with a front extension of a gradually decreasing width. In other words, the shape of the slot 50 is defined by an arc having a radius of curvature "r3" arranged at a rear side in the motor axis direction, an arc having a radius of curvature "r4" arranged at a front side in the motor axis direction, and two tangential lines 57 joining the arcs together at corresponding lateral sides.

In the present embodiment, it is possible to meaningfully increase the contact area between the large-diameter portions 76 and 78 of the shock-absorbing member 70 and the bracket 40, as compared to the comparative example illustrated in FIG. 5. Considering the above, the movement of the shock-absorbing member 70 with respect to the bracket 40 is effectively suppressed and, therefore, the toppling-direction movement of the hydraulic unit 10 can be restrained in a proper manner. In other words, according to the present embodiment, it is possible to properly control the toppling-direction movement of the hydraulic unit 10, although, as compared to the embodiment illustrated in FIG. 6, the contact area between the large-diameter portions 76 and 78 of the shock-absorbing member 70 and the bracket 40 (the seat surface area illustrated by hatching in FIG. 7B) is reduced by an amount proportionate to the replacement of the inwardly curved lines 56 with the straight tangential lines 57 at the front side of the large-diameter portions 76 and 78 of the shock-absorbing member 70. Moreover, according to the present embodiment, as compared to the embodiment illustrated in FIG. 6, the ease of assembly of the shock-absorbing member 70 is enhanced by the replacement of the inwardly curved lines 56 with the straight tangential lines 57 at the front side of the large-diameter portions 76 and 78 of the shock-absorbing member 70. Furthermore, in the present embodiment, the short-axis direction width "D" of the slot 50 becomes smaller than the diameter (2×r2) of the small-diameter portion 74 at the front side of the small-diameter portion 74 of the shock-absorbing member 70. Thus, the forward movement of the small-diameter portion 74 of the shock-absorbing member 70 with respect to the bracket 40 is suppressed, consequently making it easy to position in place the shock-absorbing member 70 in an assembly process thereof.

The term "reduced width region" used in the claims refers to a region of the slot 50 lying to the front of the insertion-fit region 52 and having a short-axis direction width "D" smaller than the diameter of the small-diameter portion 74, in the embodiments illustrated in FIGS. 6 and 7. If the radius "r2" of the small-diameter portion 74 of the shock-absorbing member 70 is equal to the radius of curvature "r3" of the arc defining the insertion-fit region 52, the reduced width region refers to a region lying to the front of the center position of the insertion-fit region 52 in the long-axis direction. On the other hand, if the radius of curvature "r3" of the arc defining the insertion-fit region 52 is a little greater than the radius "r2" of the small-diameter portion 74 of the shock-absorbing member 70, the region of the slot 50 having a short-axis direction width "D" smaller than the diameter of the small-diameter portion 74 (i.e., the reduced width region) extends from a position spaced apart in the long-axis direction from the rear end of the slot 50 by a distance equal to or less than the diameter of the small-diameter portion 74. By doing so, the contact area between the large-diameter portions 76 and 78 of the shock-absorbing member 70 and the bracket 40 can be increased at the front side of the large-diameter portions 76 and 78 of the shock-absorbing member 70, and the forward movement of the small-diameter portion 74 of the shock-absorbing member 70 can be properly restrained by means of the reduced width region.

Figure 8A:
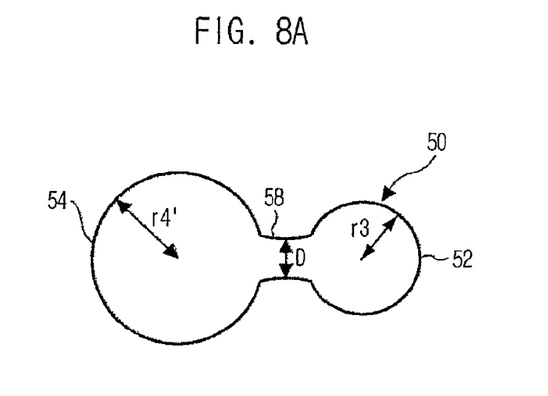
FIGS. 8A, 8B and 8C are views illustrating a further embodiment (a second modified embodiment) of the present invention.
Figure 8B:
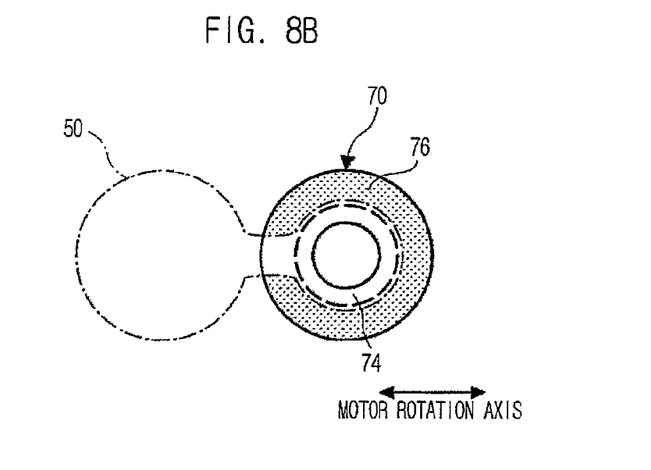
Figure 8C:
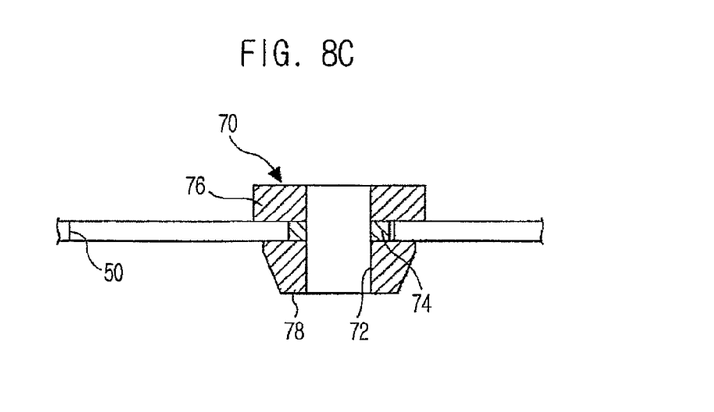

FIG. 8A shows a shape of a slot 50 according to a further embodiment of the present invention, FIG. 8B is a top view illustrating a relationship between the slot 50 of the present embodiment and the shock-absorbing member 70, and FIG. 8C is a sectional view showing the relationship. A motor axis direction is designated by an arrow in FIG. 8B wherein the left side of FIG. 8 is shown as the front of a vehicle. The present embodiment may have the same configuration as that of the foregoing embodiment (the embodiment described above with reference to FIG. 6) except for the shape of the slot 50.

In the present embodiment, the slot 50 has a long axis extending in the motor axis direction and is formed into a keyhole shape. The shape of slot 50 is defined by an arc having a radius of curvature "r3" arranged at a rear side in the motor axis direction, an arc having a radius of curvature "r4'" arranged at a front side in the motor axis direction, and a connecting part 58 joining the arcs together.

The radius of curvature "r3" corresponds to the radius "r2" of the small-diameter portion 74 of the shock-absorbing member 70 and, as illustrated in FIG. 8B, may be a little greater than the radius "r2". The radius of curvature "r4'" is greater than the radius of curvature "r3" and may have a value corresponding to the radius "r1" of the large-diameter portion 78 of the shock-absorbing member 70. The length "L" in the long-axis direction of the slot 50 may be set greater than the length (2×r1+2×r2) summing up the diameter of the small-diameter portion 74 of the shock-absorbing member 70 and the diameter of the large-diameter portion 76 of the shock-absorbing member 70. The connecting part 58 has a width "D" set smaller than the diameter of the small-diameter portion 74 of the shock-absorbing member 70.

During assembly, the large-diameter portion 78 of the shock-absorbing member 70 is first fitted into a region 54 of the slot 50 delineated by the arc having a radius of curvature "r4'" (which region will be hereinafter referred to as an "insertion hole 54"). Then, the shock-absorbing member 70 is moved rearward from the insertion hole 54 into the insertion-fit region 52, during which time the bracket 40 is sandwiched between the surfaces 76a and 78a of the large-diameter portions 76 and 78. As the shock-absorbing member 70 moves along the connecting part 58, the small-diameter portion 74 of the shock-absorbing member 70 is elastically deformed in a radial direction. Once the shock-absorbing member 70 passes the connecting part 58, the small-diameter portion 74 is restored to its original shape, whereby the task of fitting the shock-absorbing member 70 into the insertion-fit region 52 is completed.

The connecting part 58 extends forward in the long-axis direction of the slop 50. The connecting part 58 extends from a position, which is spaced apart in the long-axis direction from the rear end of the slot 50 by a distance equal to or less than the diameter of the small-diameter portion 74. The length of the connecting part 58 in the long-axis direction is equal to or longer than the difference in radius (r1−r2) of the large-diameter portion 76 and the small-diameter portion 74. By doing so, the forward movement of the small-diameter portion 74 of the shock-absorbing member 70 can be properly restrained by means of the connecting part 58 and, the contact area between the large-diameter portions 76 and 78 of the shock-absorbing member 70 and the bracket 40 can be increased at the front side of the large-diameter portions 76 and 78 of the shock-absorbing member 70. Furthermore, in the embodiment illustrated in FIG. 8, the width "D" of the connecting part 58 is set smaller than the radius "r2" of the small-diameter portion 74 of the shock-absorbing member 70. In this case, the forward movement of the small-diameter portion 74 of the shock-absorbing member 70 can be properly restrained by means of the connecting part 58 and, the contact area between the large-diameter portions 76 and 78 of the shock-absorbing member 70 and the bracket 40 can be maximized on the front side of the large-diameter portions 76 and 78 of the shock-absorbing member 70, thereby effectively suppressing the movement of the shock-absorbing member 70 with respect to the bracket 40.

In the present embodiment, it is possible to meaningfully increase the contact area between the large-diameter portions 76 and 78 of the shock-absorbing member 70 and the bracket 40, as compared to the comparative example illustrated in FIG. 5. Considering the above, the movement of the shock-absorbing member 70 with respect to the bracket 40 is effectively suppressed and, therefore, the toppling-direction movement of the hydraulic unit 10 can be properly restrained. Moreover, because the forward movement of the small-diameter portion 74 of the shock-absorbing member 70 is stopped by the rear end of the connecting part 58, it is easy to position in place the shock-absorbing member 70 in an assembly process. Furthermore, in the present embodiment, formation of the insertion hole 54 makes it possible to enhance the ease of assembly of the shock-absorbing member 70, while maintaining a broad contact area at the front side of the large-diameter portions 76 and 78 of the shock-absorbing member 70, by forming the connecting part 58.

Moreover, the term "reduced width region" used in the claims corresponds to the connecting part 58 in the embodiment illustrated in FIG. 8.

Figure 9:
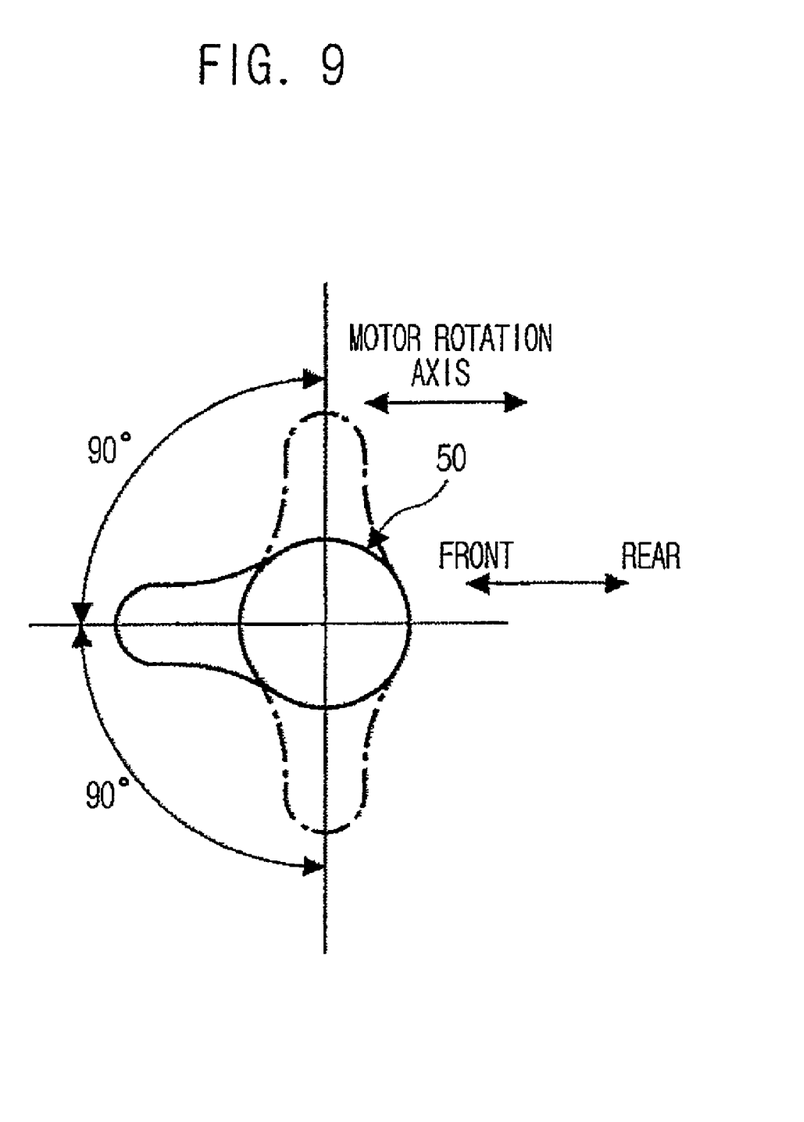
FIG. 9 is a view showing the relationship between the long axis of a slot 50 and the rotational axis of the motor.

FIG. 9 is a view showing the relationship between the long axis of the slot 50 and the motor rotation axis. In the respective embodiments described above, the direction of the long axis of the slot 50 and the direction of the motor rotation axis are parallel with each other when viewed from the top. However, insofar as the direction of the long axis of the slot 50 makes an angle of no greater than 90 degrees with respect to the direction of the motor rotation axis as depicted by a single-dotted chain line in FIG. 9, it is possible to accommodate directional errors and also to secure a required contact area, thereby properly controlling the toppling-direction movement of the hydraulic unit 10.

For example, unlike the foregoing embodiments in which the large-diameter portions 76 and 78 have the same radius "r1", the radii "r1" of the large-diameter portions 76 and 78 need not to be equal but may differ from each other so long as they are greater than the radius "r2" of the small-diameter portion 74.

Furthermore, in the foregoing embodiments, the insertion-fit region 52 is provided at the rear of the slot 50 and the contact area is maximized at the rear of the slot 50 in order to effectively suppress the toppling movement of the hydraulic unit 10 in the rear direction. However, the slot 50 employed in the foregoing embodiments may have a shape inverted in the front-rear direction. In this case, the load can be received by an increased contact area at the front of the slot 50 against the toppling movement of the hydraulic unit 10 in the rear direction. Thus, as opposed to the comparative example shown in FIG. 5, it is possible to properly control the toppling-direction movement of the hydraulic unit 10.

Moreover, the number and position of the boltholes, particularly the bolthole 16, can be arbitrarily changed in the foregoing embodiments. For example, it may be necessary to locate the bolthole 16 at a position other than the position in which the axis of the bolthole 16 intersects the motor rotation axis due to a restriction within the hydraulic unit 10. Needless to say, the present invention is applicable to this alternative configuration.

According to the present invention described herein, it is possible to provide a hydraulic unit support structure that enables a shock-absorbing member to exhibit a good shock absorbing function, while maintaining excellent ease of assembly.

While the present invention has been described with respect to certain example embodiments, it will be apparent to those skilled in the art that various changes and modifications may be made without departing from the spirit and scope of the invention as defined in the following claims.

The invention claimed is:

1. A support structure for a hydraulic unit, the support structure comprising:
    a bracket having a slot and seat surfaces formed around the slot; and
    a shock-absorbing member attached to the hydraulic unit, wherein the shock-absorbing member is fitted into the slot of the bracket so that the hydraulic unit is supported on the bracket by the shock-absorbing member,
    wherein the shock-absorbing member has a small-diameter portion that is inserted into the slot of the bracket and large-diameter portions that contact the seat surfaces of the bracket around the slot, the slot of the bracket having a length in a long-axis direction greater than a diameter of the small-diameter portion,
    wherein the slot of the bracket has an insertion-fit region formed on a side of a first end of the slot in the long-axis direction, the insertion-fit region having a radius of curvature generally corresponding to a radius of the small-diameter portion of the shock-absorbing member, and a reduced width region formed at a first position spaced apart toward a second end of the slot, which is opposite the first end, from the first end in the long-axis direction by a distance substantially corresponding to the diameter of the small-diameter portion, the reduced width region having a width smaller than the diameter of the small-diameter portion of the shock-absorbing member in a short-axis direction orthogonal to the long-axis direction, and
    wherein the long-axis direction of the slot makes an angle of no greater than 90 degrees with respect to a motor rotation axis of the hydraulic unit, when viewed from a top in a center axis direction of the shock-absorbing member.

2. The support structure according to claim 1, wherein the slot of the bracket has a length in the long-axis direction greater than the sum of a radius of the large-diameter portion and the radius of the small-diameter portion, and
    wherein the reduced width region extends toward the second end in the long-axis direction of the slot from the first position at least by a distance equal to the difference in radius of the large-diameter portions and the small-diameter portion.

3. The support structure according to claim 1, wherein the slot of the bracket has a teardrop shape, a gourd shape or a keyhole shape.

4. A support structure for a hydraulic unit, the support structure comprising:
    a bracket having a slot and seat surfaces formed around the slot; and
    a shock-absorbing member attached to the hydraulic unit, wherein the shock-absorbing member is fitted into the slot of the bracket so that the hydraulic unit is supported on the bracket by the shock-absorbing member,
    wherein the shock-absorbing member has a small-diameter portion that is inserted into the slot of the bracket and large-diameter portions that contact the seat surfaces of the bracket around the slot, the slot of the bracket having a length in a long-axis direction greater than a diameter of the small-diameter portion,
    wherein the slot of the bracket has an insertion-fit region formed on a side of a first end of the slot in the long-axis direction, the insertion-fit region having a radius of curvature generally corresponding to a radius of the small-diameter portion of the shock-absorbing member, and a reduced width region formed at a first position spaced apart toward a second end of the slot, which is opposite the first end, from the first end in the long-axis direction by a distance substantially corresponding to the diameter of the small-diameter portion, the reduced width region having a width smaller than the diameter of the small-diameter portion of the shock-absorbing member in a short-axis direction orthogonal to the long-axis direction, and
    wherein the insertion-fit region of the slot is provided at an end furthest from a mounting position of a motor of the hydraulic unit, when viewed from a top in a center axis direction of the shock-absorbing member.

5. The support structure according to claim 4, wherein the slot of the bracket has a length in the long-axis direction greater than the sum of a radius of the large-diameter portion and the radius of the small-diameter portion, and
    wherein the reduced width region extends toward the second end in the long-axis direction of the slot from the first position at least by a distance equal to the difference in radius of the large-diameter portions and the small-diameter portion.

6. The support structure according to claim 4, wherein the slot of the bracket has a teardrop shape, a gourd shape or a keyhole shape.

7. A support structure for a hydraulic unit, the support structure comprising:
    a bracket having a slot and seat surfaces formed around the slot; and
    a shock-absorbing member attached to the hydraulic unit, wherein the shock-absorbing member is fitted into the slot of the bracket so that the hydraulic unit is supported on the bracket by the shock-absorbing member,
    wherein the shock-absorbing member has a small-diameter portion that is inserted into the slot of the bracket and large-diameter portions that contact the seat surfaces of the bracket around the slot,
    wherein the slot of the bracket has a length in a long-axis direction greater than a diameter of the small-diameter portion and the shape of slot is defined by an arc having a first radius of curvature generally corresponding to a radius of the small diameter portion, an arc having a second radius of curvature smaller than the first radius of curvature, and two tangential lines joining the arcs together at corresponding lateral sides, and wherein the long-axis direction of the slot makes an angle of no greater than 90 degrees with respect to a motor rotation axis of the hydraulic unit, when viewed from a top in a center axis direction of the shock absorbing member.

8. A support structure for a hydraulic unit, the support structure comprising:
   a bracket having a slot and seat surfaces formed around the slot; and
   a shock-absorbing member attached to the hydraulic unit, wherein the shock-absorbing member is fitted into the slot of the bracket so that the hydraulic unit is supported on the bracket by the shock-absorbing member,
   wherein the shock-absorbing member has a small-diameter portion that is inserted into the slot of the bracket and large-diameter portions that contact the seat surfaces of the bracket around the slot,
   wherein the slot of the bracket has a length in a long-axis direction greater than a diameter of the small-diameter portion and the shape of slot is defined by an arc having a first radius of curvature generally corresponding to a radius of the small diameter portion, an arc having a second radius of curvature smaller than the first radius of curvature, and two tangential lines joining the arcs together at corresponding lateral sides, and
   wherein the arc having the first radius of curvature is provided to an end side furthest from a mounting position of a motor of the hydraulic unit, when viewed from a top in a center axis direction of the shock-absorbing member.

9. A support structure for a hydraulic unit, the support structure comprising:
   a bracket having a slot and seat surfaces formed around the slot; and
   a shock-absorbing member attached to the hydraulic unit, wherein the shock-absorbing member is fitted into the slot of the bracket so that the hydraulic unit is supported on the bracket by the shock-absorbing member,
   wherein the shock-absorbing member has a small-diameter portion that is inserted into the slot of the bracket and large-diameter portions that contact the seat surfaces of the bracket around the slot,
   wherein the slot of the bracket has a length in a long-axis direction of the slot greater than a diameter of the small-diameter portion and the shape of the slot is defined by a first arc having a first radius of curvature generally corresponding to the radius of the small-diameter portion, and a second arc having a second radius of curvature smaller than the first radius of curvature, and two inwardly curved lines joining the first and second arcs together at corresponding lateral sides, and
   wherein the long-axis direction of the slot makes an angle of no greater than 90 degrees with respect to a motor rotation axis of the hydraulic unit, when viewed from a top in a center axis direction of the shock-absorbing member.

10. A support structure for a hydraulic unit, the support structure comprising:
    a bracket having a slot and seat surfaces formed around the slot; and
    a shock-absorbing member attached to the hydraulic unit, wherein the shock-absorbing member is fitted into the slot of the bracket so that the hydraulic unit is supported on the bracket by the shock-absorbing member,
    wherein the shock-absorbing member has a small-diameter portion that is inserted into the slot of the bracket and large-diameter portions that contact the seat surfaces of the bracket around the slot,
    wherein the slot of the bracket has a length in a long-axis direction of the slot greater than a length summing up a diameter of the small-diameter portion and a diameter of the large-diameter portion, and the shape of the slot is defined by a first arc having a first radius of curvature generally corresponding to the radius of the small diameter portion, a second arc having a second radius of curvature greater than the first curvature, and a connecting part defined by two lines generally parallel to a rotational axis of a motor of the hydraulic unit, which joins the first and second arcs together,
    wherein a width between the two lines is smaller than the diameter of the small-diameter portion of the shock-absorption member in a short-axis direction orthogonal to the long-axis direction, and a length of the connecting part in the long-axis direction is equal to or longer than a difference in radius of the large-diameter portion and the small-diameter portion, and
    wherein the long-axis direction of the slot makes an angle of no greater than 90 degrees with respect to a motor rotation axis of the hydraulic unit, when viewed from a top in a center axis direction of the shock absorbing member.

11. A support structure for a hydraulic unit, the support structure comprising:
    a bracket having a slot and seat surfaces formed around the slot; and
    a shock-absorbing member attached to the hydraulic unit, wherein the shock-absorbing member is fitted into the slot of the bracket so that the hydraulic unit is supported on the bracket by the shock-absorbing member,
    wherein the shock-absorbing member has a small-diameter portion that is inserted into the slot of the bracket and large-diameter portions that contact the seat surfaces of the bracket around the slot,
    wherein the slot of the bracket has a length in a long-axis direction of the slot greater than a diameter of the small-diameter portion and the shape of the slot is defined by a first arc having a first radius of curvature generally corresponding to the radius of the small-diameter portion, and a second arc having a second radius of curvature smaller than the first radius of curvature, and two inwardly curved lines joining the first and second arcs together at corresponding lateral sides, and
    wherein the insertion-fit region of the slot is provided at an end furthest from a mounting position of a motor of the hydraulic unit, when viewed from a top in a center axis direction of the shock-absorbing member.

* * * * *